United States Patent Office 3,257,441
Patented June 21, 1966

3,257,441
POLYCHLOROPHENYL METHYLENE BIS
(DIALKYLDITHIOCARBAMATES)
Marcel A. Gradsten, Demarest, N.J., assignor, by mesne assignments, to Tenneco Chemicals, Inc., a corporation of Delaware
No Drawing. Filed Mar. 13, 1962, Ser. No. 179,461
2 Claims. (Cl. 260—455)

This invention relates to novel compounds and to a method for their preparation. It further relates to herbicidal compositions containing these compounds as their herbicidally-active component and to their use.

The compounds of the present invention are polychlorophenyl methylene bis (dialkyldithiocarbamates) that have the structural formula

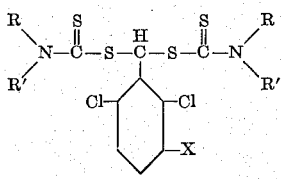

wherein X represents a hydrogen or chlorine atom and R and R' each represents an alkyl group containing from 1 to 4 carbon atoms. Illustrative of these compounds are 2,6-dichlorophenyl methylene bis (dimethyldithiocarbamate), 2,6-dichlorophenyl methylene bis (dipropyldithiocarbamate), 2,6-dichlorophenyl methylene bis (dibutyldithiocarbamate), 2,3,6-trichlorophenyl methylene bis (dimethyldithiocarbamate), and 2,3,6-trichlorophenyl methylene bis (dibutyldithiocarbamate).

These compounds may be prepared by any convenient procedure. For example, they may be prepared by the reaction of an alkali metal dialkyldithiocarbamate with the appropriate polychlorobenzal halide.

The polychlorophenyl methylene bis (dialkyldithiocarbamates) of the present invention have unusual and valuable activity as selective herbicides. They may be applied to the soil or other medium normally supporting plant growth, or they may be applied to plants to control their growth. They can be used to control weed growth in an area containing a crop, and they can be used to destroy all of the plants in an area.

The herbicidally-active compounds may be applied as such for the control of plant growth. Ordinarily and preferably, however, they are used in combination with an inert diluent or carrier to make it easier to measure accurately and to apply evenly the small amounts of the compounds that are required to control or inhibit plant growth as well as to apply them in a form that will be readily dispersed through the soil and/or absorbed by the plants. These compounds may be dispersed in water with or without the aid of a wetting agent and the resulting aqueous dispersions employed as sprays. Alternatively the compounds may be mixed with or deposited upon finely-divided solid carriers, such as talc, clay, diatomaceous earth, silica, walnut shell flour, and the like. The resulting compositions may be applied as dusts or further diluted with liquid carriers. These compounds may also be used as the active herbicidal constituent in ketone, alcohol, ether, or hydrocarbon solutions or in oil-in-water emulsions. The concentration of the herbicidal compound in the composition may vary widely and depends upon a number of factors, the most important of which are the amount of the composition to be applied per unit of area and the type or types of plants being treated. In most cases the herbicidal compositions are applied as sprays or dusts that contain from about 0.1% to 80% by weight of the active component. Two or more of the herbicidal compounds of this invention may be present in the compositions; if desired other herbicidal compounds may also be present.

The invention is further illustrated by the examples that follow. It is to be understood, however, that these examples are not to be construed as being limitative, but are furnished merely for the purpose of illustration.

Example 1

A mixture of 110 grams of sodium dimethyldithiocarbamate, 76 grams of 2,6-dichlorobenzal chloride, and 150 ml. of ethanol was heated at its reflux temperature (86° C.) for 5.5 hours. The reaction mixture was cooled to room temperature and filtered. The precipitate, which consisted of sodium chloride and unreacted sodium dimethyldithiocarbamate, was washed with two 20 ml. portions of ethanol. The filtrate and wash ethanol were combined and concentrated until the product crystallized. The product was isolated, washed with water and dried. There was obtained 47 grams of 2,6-dichlorophenyl methylene bis (dimethyldithiocarbamate), a tan solid that melted at 225.5°–227.5° C. This product contained 17.70% Cl and 31.8% S. (Calculated for $C_{13}H_{16}Cl_2N_2S_4$: Cl, 17.75%; S, 32.1%.) The infrared analysis of the product confirmed its structure.

Any of the aforementioned polychlorophenyl methylene bis (dialkyldithiocarbamate) may be prepared by this procedure using the appropriate alkali metal dialkyldithiocarbamate and polychlorobenzal halide.

Example 2

A series of tests was carried out in which the product of Example 1 was evaluated as a herbicide. In each case the compound was applied as a 0.3% aqueous suspension at a rate equivalent to 10 pounds per acre. In these tests, 2,6-dichlorophenyl methylene bis (dimethyldithiocarbamate) was found to be particularly effective in controlling the growth of monocotyledonous plants when applied as a pre-emergence spray and particularly effective in controlling the growth of dicotyledonous plants when applied as a post-emergence spray.

In a similar manner each of the other polychlorophenyl methylene bis (dimethyldithiocarbamates) may be used as the active component in herbicidal compositions.

What is claimed is:
1. A compound having the structural formula

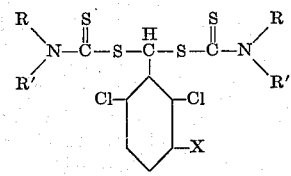

wherein X represents a member selected from the group consisting of hydrogen and chlorine and R and R' each represents an alkyl group containing from 1 to 4 carbon atoms.

2. 2,6-dichlorophenyl methylene bis (dimethyldithiocarbamate).

(References on following page)

References Cited by the Examiner

UNITED STATES PATENTS

| | | | |
|---|---|---|---|
| 1,736,429 | 11/1929 | Cadwell | 260—455 |
| 1,873,934 | 8/1932 | Lommel et al. | 260—455 |
| 2,762,696 | 9/1956 | Gerjovich et al. | 71—2.6 |
| 2,764,478 | 9/1956 | Searle | 71—2.6 |
| 2,910,498 | 10/1959 | Meuly | 260—455 |
| 3,061,624 | 10/1962 | Ludvik et al. | 260—455 |

OTHER REFERENCES

MacKay et al., Chemical Abstracts, 1961, volume 55, pp. 12767f.

CHARLES B. PARKER, *Primary Examiner.*

S. H. LIEBERSTEIN, D. R. MAHANAND,
*Assistant Examiners.*